(12) United States Patent
Metzinger et al.

(10) Patent No.: US 7,966,901 B2
(45) Date of Patent: Jun. 28, 2011

(54) TORQUE TRANSFER DEVICE

(75) Inventors: Manuel Metzinger, Buehl (DE); Ivo Agner, Buehl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 439 days.

(21) Appl. No.: 11/975,610

(22) Filed: Oct. 18, 2007

(65) Prior Publication Data

US 2008/0141806 A1 Jun. 19, 2008

(30) Foreign Application Priority Data

Oct. 21, 2006 (DE) .................. 10 2006 049 729

(51) Int. Cl.
*F16H 3/08* (2006.01)
*F16D 21/02* (2006.01)
*F16D 13/72* (2006.01)

(52) U.S. Cl. .... 74/331; 192/48.8; 192/70.12; 192/87.11

(58) Field of Classification Search .................. 74/340, 74/331; 192/48.8, 48.619, 70.12, 87.11, 192/87.15, 85.24, 85.35, 85.61, 113.34
See application file for complete search history.

(56) References Cited

U.S. PATENT DOCUMENTS

| 4,458,793 | A * | 7/1984 | Riese et al. ................. 192/12 A |
| 6,827,191 | B2 * | 12/2004 | Kuhstrebe .................. 192/48.92 |
| 7,392,890 | B2 * | 7/2008 | Agner .......................... 192/48.8 |
| 2005/0279604 | A1 * | 12/2005 | Vetter et al. .................. 192/48.8 |
| 2006/0021842 | A1 * | 2/2006 | Berhan ........................ 192/48.8 |
| 2006/0081435 | A1 * | 4/2006 | Heinrich et al. ........... 192/70.11 |
| 2007/0170034 | A1 | 7/2007 | Metzinger et al. |

FOREIGN PATENT DOCUMENTS

| DE | 10 2005 027 610 | 12/2005 |
| EP | 1 813 831 A1 | 8/2007 |
| EP | 1 826 429 A1 | 8/2007 |
| JP | 2006 189112 A | 7/2006 |

* cited by examiner

*Primary Examiner* — Roger Pang
(74) *Attorney, Agent, or Firm* — Simpson & Simpson, PLLC

(57) ABSTRACT

A torque transfer device, in particular in the power train of a motor vehicle, having at least one wet-running clutch device, in particular a multi-plate clutch device, which is actuatable by an actuating lever device, in particular an actuating lever spring device, through a pressure member. The pressure member has a blocking cross section which is opened toward a pressure chamber.

15 Claims, 2 Drawing Sheets

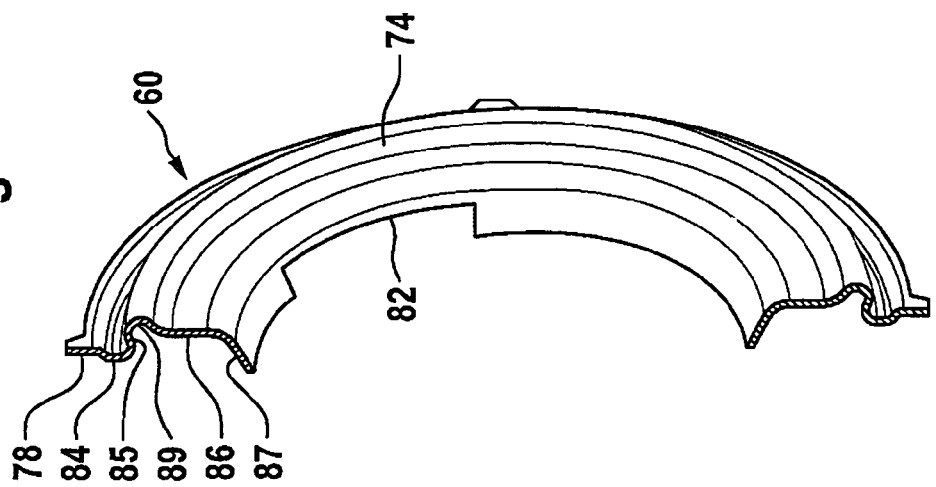
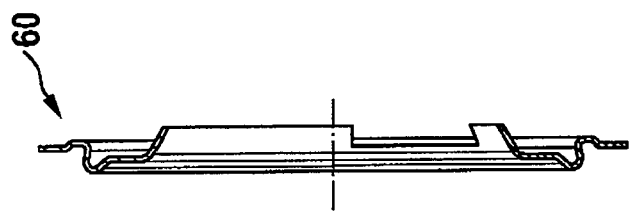
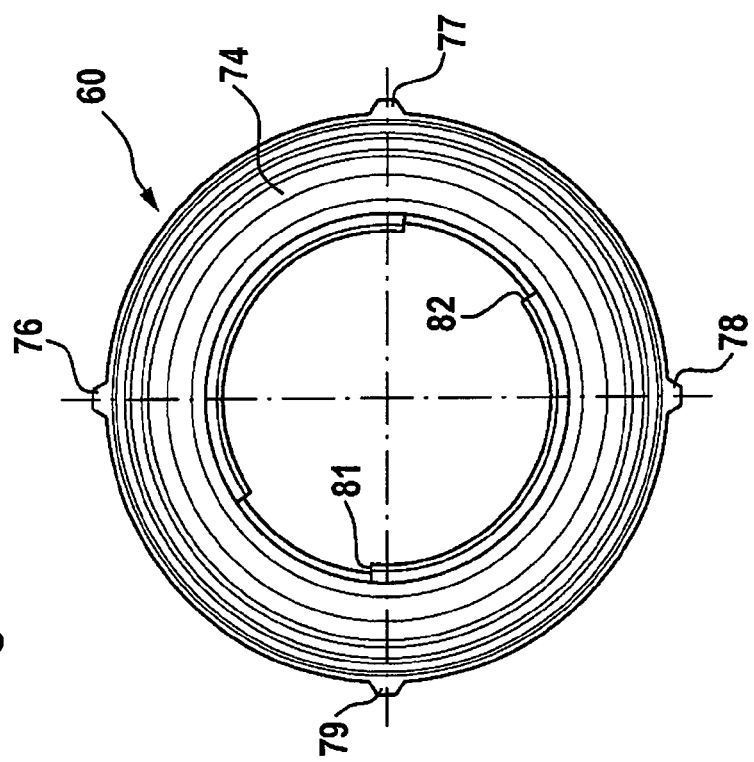

US 7,966,901 B2

TORQUE TRANSFER DEVICE

CROSS REFERENCE TO RELATED APPLICATIONS

This patent claims priority of German Patent Application No. 10 2006 049 729.5, filed Oct. 21, 2006, which application is incorporated herein by reference.

BACKGROUND OF THE INVENTION

The invention relates to a torque transfer device, in particular in the power train of a motor vehicle, having at least one wet-running clutch device, in particular a multi-plate clutch device, which is actuatable by means of an actuating lever device, in particular an actuating lever spring device, through a pressure member. A torque transfer device of this type is known for example from German published unexamined application DE 10 2005 027 610 A1.

SUMMARY OF THE INVENTION

The present invention broadly comprises a torque transfer device, in particular in the power train of a motor vehicle, having at least one wet-running clutch device, in particular a multi-plate clutch device, which is actuatable by means of an actuating lever device, in particular an actuating lever spring device, through a pressure member, where the pressure member has a blocking cross section which is opened toward a pressure chamber. According to an essential aspect of the invention, in addition to its pressure force transmitting function the pressure member fulfills at least one other function, such as transferring torque or reducing the leakage from the pressure chamber. The pressure chamber is supplied with a cooling medium that serves to cool the clutch device, for example with the help of a cooling oil pump. The blocking cross section bounds an annular space in which a ring of cooling medium builds up under the effect of centrifugal force during operation of the rotating clutch device. Leakage from the pressure chamber caused by centrifugal force is prevented or reduced by the pressure of the ring of cooling medium.

A preferred exemplary embodiment of the torque transfer device is characterized by the fact that the blocking cross section is essentially C-shaped. The blocking cross section is preferably designed and situated so that a leakage gap issues between the free ends of two legs of the C-shaped blocking cross section.

Another preferred exemplary embodiment of the torque transfer device is characterized by the fact that the blocking cross section bounds an annular space which is connected to the pressure chamber through a leakage gap. A ring of cooling medium collects in the annular space under the effect of centrifugal force during operation of the rotating clutch device.

Another preferred exemplary embodiment of the torque transfer device is characterized by the fact that the pressure member is ring-shaped. The ring-type pressure member is preferably situated between the actuating lever device and a clutch disc, in particular a clutch plate; in particular, it is clampable or is clamped.

Another preferred exemplary embodiment of the torque transfer device is characterized by the fact that the pressure member has at least one torque delivery element, which is connected in a rotationally fixed connection, at a torque transfer interface between the pressure member and a pump drive element that drives a pump, to the pump drive element. Preferably, the torque transfer interface is realized with such a large diameter that the associated contact force, i.e., the unit surface pressure, is sufficiently reduced so that a single torque delivery element is adequate to transfer the torque that occurs in operation.

Another preferred exemplary embodiment of the torque transfer device is characterized by the fact that the pressure member has radially on its inside at least one in particular circular-arc-shaped recess. The recess creates a possibility of meshing for a complementary designed projection which is provided on the pump drive element.

Another preferred exemplary embodiment of the torque transfer device is characterized by the fact that a projection is provided radially outside on the pump element, which meshes with the recess on the pressure member. That creates a rotationally fixed connection between the pump drive element and the pressure member.

Another preferred exemplary embodiment of the torque transfer device is characterized by the fact that the pump drive element is rotatably supported on a bearing element of the clutch device, in particular a plate carrier, by a bearing device with sealing function. The support of the pump drive element on the bearing element is preferably designed so that no cooling oil can escape in the radial direction.

Another preferred exemplary embodiment of the torque transfer device is characterized by the fact that the pressure member has at least one torque delivery element, which is connected in a rotationally fixed connection, at a torque transfer interface between the pressure member and the clutch device, in particular a plate carrier of the clutch device, to the clutch device, in particular to the plate carrier. That makes it possible to transfer torque in a simple manner to drive a cooling oil pump.

Another preferred exemplary embodiment of the torque transfer device is characterized by the fact that the pressure member has radially on its outside at least one driver lug. The driver lug, which is also referred to as a driver cog, creates a positive-locking connection between the pressure member and the clutch device.

Another preferred exemplary embodiment of the torque transfer device is characterized by the fact that a recess is provided on the clutch device, with which the driver lug of the pressure member meshes. Preferably, a plurality of driver lugs is distributed on the circumference of the pressure member, in particular uniformly.

Another preferred exemplary embodiment of the torque transfer device is characterized by the fact that the pressure member is situated between the actuating lever device and a clutch disk, in particular a clutch plate. A plurality of clutch disks, which are also referred to as clutch plates, are pressed together by the pressure member in order to produce a frictional connection.

Another preferred exemplary embodiment of the torque transfer device is characterized by the fact that the pressure member has a pressure lug which is in contact with the clutch disk. The pressure lug preferably extends in the axial direction.

Another preferred exemplary embodiment of the torque transfer device is characterized by the fact that the pressure member, viewed in cross section, has a protuberance with which the actuating lever device is in contact. The magnitude of the diameter on which the protuberance is situated influences the transmission ratio of the actuating lever device.

The invention also relates to a transmission, in particular a double-clutch transmission, having at least one transmission input shaft, in particular having two transmission input shafts, and having a torque transfer device described earlier for transferring torque between a combustion engine and the transmission.

BRIEF DESCRIPTION OF THE DRAWINGS

Additional advantages, characteristics and details of the invention are evident from the following description, in which an exemplary embodiment is described in detail with reference to the drawing. The figures show the following:

FIG. 2 illustrates a pressure member of the torque transfer device from FIG. 1 in top view;

FIG. 3 illustrates the pressure member from FIG. 2 in a sectional view; and,

FIG. 4 is a perspective sectional view of the pressure member from FIGS. 2 and 3.

DETAILED DESCRIPTION OF THE INVENTION

Figure 1:
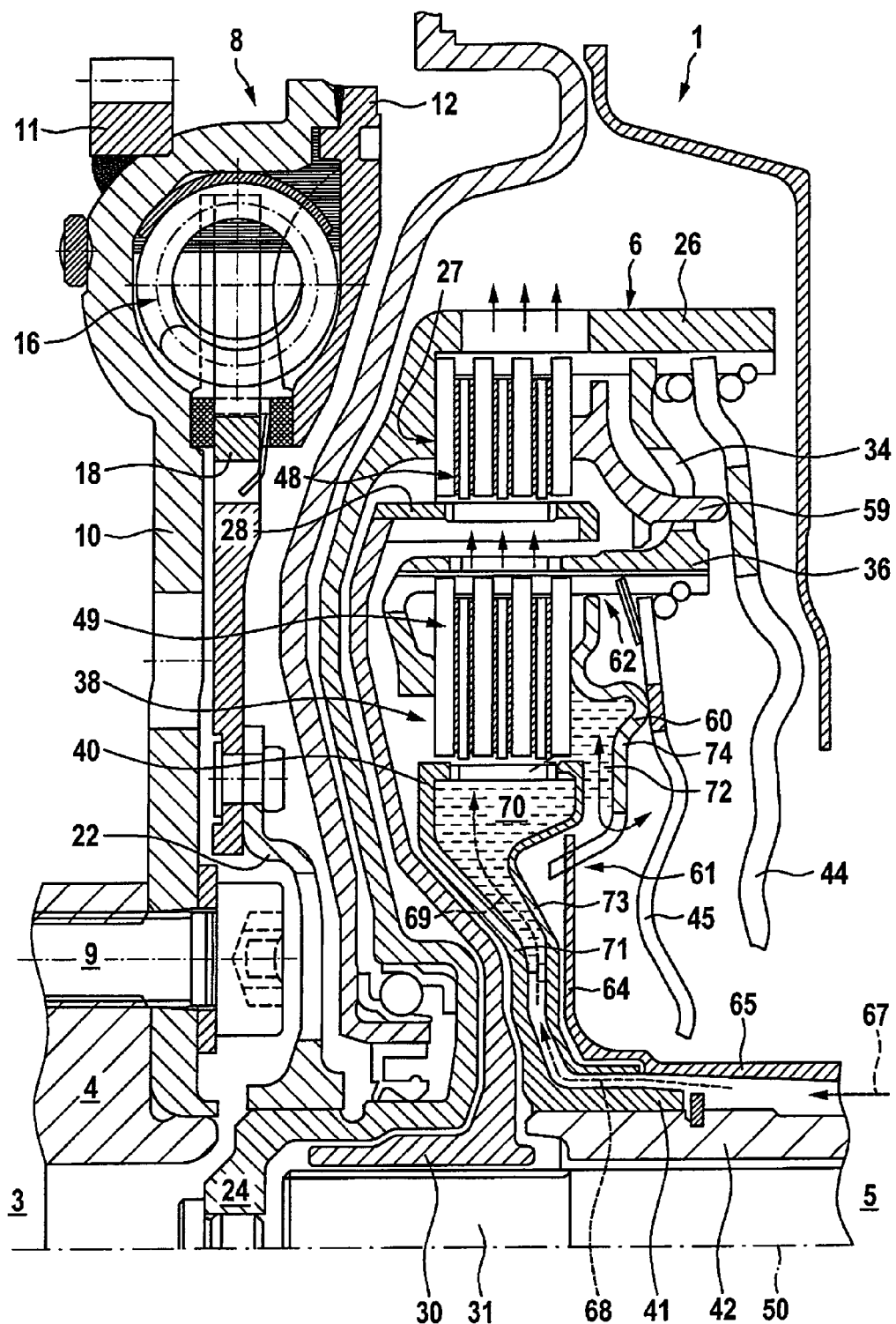
FIG. 1 depicts a half section through a power train having a torque transfer device according to the invention.

Part of power train 1 of a motor vehicle is depicted in FIG. 1. Situated between drive unit 3, in particular a combustion engine, from which crankshaft 4 extends, and transmission 5, is wet operating double clutch 6 of multiple-disk design. Connected between drive unit 3 and double clutch 6 is rotary vibration damping device 8. Rotary vibration damping device 8 is a damped flywheel.

Crankshaft 4 of combustion engine 3 is rigidly connected through a screw connection 9 to input part 10 of rotary vibration damping device 8. Input part 10 of rotary vibration damping device 8 essentially has the form of a circular ring disk extending in the radial direction, to which starter gear rim 11 is welded radially on the outside. In addition, an inertial mass 12 is welded onto the input part 10 of rotary vibration damping device 8. Inertial mass 12 and input part 10 of rotary vibration damping device 8 form vibration damper cage 14, which at least partially incorporates a plurality of energy storage devices, in particular spring devices 16.

Output part 18 of rotary vibration damping device 8 engages spring devices 16. Output part 18 is connected through connecting part 22 to input part 24 of double clutch 6 in a rotationally fixed connection. Clutch input part 24 is joined in one piece to outer plate carrier 26 of a first multi-plate clutch assembly. Positioned radially inside outer plate carrier 26 is inner plate carrier 28 of first multi-plate clutch assembly 27. Inner plate carrier 28 is attached to hub piece 30, which is connected through toothing to first transmission input shaft 31 in a rotationally fixed connection. First transmission input shaft 31 is designed as a solid shaft.

Clutch input part 24, or outer plate carrier 26 of first multi-plate clutch assembly 27, which is connected to the latter in a single piece, is connected through connecting part 34 to an outer plate carrier 36 of a second multi-plate clutch assembly 38 in a rotationally fixed connection. In the example shown, connecting part 34 is connected to outer plate carrier 36 in a single piece. Positioned radially inside outer plate carrier 36 is an inner plate carrier 40 of second multi-plate clutch assembly 38, which is connected to hub part 41 in a single piece. Hub part 41 is connected through toothing in a rotationally fixed connection to second transmission input shaft 42, which is constructed as a hollow shaft. First transmission input shaft 31 is situated in second transmission input shaft 42 so that it can rotate.

The two multi-plate clutch assemblies 27 and 38 are operated by means of actuating levers 44, 45, whose radially inner ends are supported on actuating bearings. The actuating bearings are actuated in the axial direction with the help of actuating pistons. Actuating levers 44, 45 are preferably connected to associated diaphragm spring devices in a single piece.

Each friction clutch 27, 38 has input-side and output-side friction units 48, 49, which may be acted on by means of axial pressing together parallel to axis of rotation 50 of at least one of transmission input shafts 31, 42 to form a frictional engagement. Friction units 48, 49 of two friction clutches 27, 38 are situated radially one above the other, and are formed of a plurality of frictional companion bodies alternating layer by layer in the axial direction on the input side and output side.

Pressure member 59, 60 is situated in each case between actuating levers 44, 45 and associated friction units 48, 49. The clamping force to actuate double clutch 6 is transmitted from actuating levers 44, 45 to associated friction units 48, 49 through pressure members 59, 60. Pressure member 60 is connected in a rotationally fixed connection to collar 64 of drive sleeve 65 radially on the inside of torque delivery interface 61. Radially on the outside of another torque delivery interface 62, pressure member 60 is connected in a rotationally fixed connection to the outer plate carrier 36 of the second multi-plate clutch assembly.

Drive sleeve 65 is connected in a rotationally fixed connection to a pump drive element of a pump (not shown) which serves to provide a flow of cooling agent to cool at least one friction clutch 27, 38. The pump is, for example, an internal gear pump, in particular a gerotor pump, which is driven by means of crankshaft 4. Arrows 67, 68, 69 indicate that the flow of cooling agent, in particular the flow of cooling oil, provided by the pump, enters into pressure chamber 70 through an annular space that is formed between transmission input shaft 42 and drive sleeve 65. Pressure chamber 70 is bounded laterally in the axial direction by radial segment 71 of inner plate carrier 40 and by guide ring 73. Through a leakage gap between guide ring 73 and inner plate carrier 40 or friction unit 49, cooling agent from pressure chamber 70 enters into annular space 72, which is bounded by ring-type basic body 74 of pressure member 60.

FIGS. 2 through 4 depict pressure member 60 with ring-type basic body 74 in three different views. Radially on the outside of ring-type basic body 74, which has essentially the form of a circular ring disk, four driver cogs 76 through 79 are distributed uniformly around the outer circumference. The driver cogs 76 through 79, which are also referred to as driver lugs, extend radially outward from the outer circumference of the ring-type basic body 74. The width of driver cogs 76 through 79 decreases toward the outside. Radially on the inside, ring-type basic body 74 has two diametrically situated recesses 82, which have essentially the form of circular arcs.

In FIG. 4 it can be seen that ring-type basic body 74, viewed in cross section, has a circumferential pressure nose radially on the outside. A leg 85 of an essentially C-shaped blocking cross section proceeds from the pressure nose 84. Leg 85 is connected in a single piece to a base 86, from which another leg 87 proceeds. In the transition area between the leg 85 and the base 86, ring-type basic body 74 has a circumferential protuberance 89.

According to an essential aspect of the invention, a pressure member of a small size is created, into which various functions are integrated to save additional parts. Pressure member 60 is preferably made in a single piece as a sheet metal part with great stiffness. Pressure member 60 according to the invention makes it possible in particular to save a separate pump drive. That enables the costs of the wet-running double clutch to be further reduced. In addition, the cooling oil circuit is improved and the drag torque is reduced by pressure member 60 according to the invention. That makes it possible to save fuel.

In the wet-running double clutch transmission depicted in FIG. 1, the clutch disks or plates of friction unit 49 of the second multi-plate clutch assembly 38 are pressed against the transmission 5 by pressure member 60 to transfer the existing torque. In addition, pressure member 60 according to the invention fulfills two other functions. On the one hand, the inward-drawn pot of the ring-type basic body 74, that is, the blocking cross section formed by the base 86 with the legs 85, 87, allows an oil ring to be built up in the annular space 72, whose pressure prevents greater leakage in the centrifugal oil gap. That supports the cooling function of the clutch plates.

In addition, drive sleeve 65 is driven rotationally by way of the recesses 81, 82, which are engaged by corresponding radial projections of the collar 64. Additionally, driver cogs 76 through 79 engage corresponding cutouts in outer plate carrier 36. Thus a rotationally fixed connection is created between outer plate carrier 36 and drive sleeve 65 through pressure member 60. That enables the engine speed of crankshaft 4 to be passed along to the cooling oil pump of the double clutch transmission, in order to maintain a constant cooling oil volume flow.

Pressure member 60 is situated between actuating lever spring 45 and friction unit 49, which are surrounded by the plate pack, and serves first and foremost to build up the clamping pressure in the second multi-plate clutch assembly 38. Actuating lever spring 45 rests against the protuberance 89 and presses the plate pack of friction unit 49 together with pressure nose 84. The transmission ratio of the actuating lever 45 for the clutch assembly 38 is determined with the diameter for clamping the actuating lever spring 45 in the outer plate carrier 36, the diameter of the actuating lever spring 45 on the associated actuating system, and the diameter of the protuberance of pressure member 60.

The support of the pump drive sleeve 65 on inner plate carrier 40, to which guide ring 73 belongs, is designed so that the cooling oil cannot escape radially. By choosing a suitable bearing, for example a slide bearing, a sealing function can be fulfilled. The bearing is designed so that cooling oil is not influenced in its direction of flow by the bearing, and flows directly into the pressure chamber 70.

The cooling oil from the pressure chamber 70 that does not directly reach the grooves of the friction plates of friction unit 49 escapes through the leakage gap from the pressure chamber into the annular space 72, which is bounded by the base 86 and the legs 85, 87 of the ring-type basic body 74 of pressure member 60. The rotary motion of the individual components causes the cooling agent to accumulate radially at the outside on the leg 85, and builds up a ring of centrifugal oil, whose pressure counteracts further leakage. The differential speed that develops between the parts bounding the pressure chamber 70 and the pressure member 60 when clutch assembly 60 is not actuated supports the buildup effect in the annular space 72.

REFERENCE NUMBERS

1 power train
3 drive unit
4 crankshaft
5 transmission
6 double clutch
9 screw connection
8 rotary vibration damping unit
10 input part
11 starter ring gear
12 inertial mass
16 spring device
18 output part
22 connecting part
24 input part
26 outside plate carrier
27 first multiple-disk clutch assembly
28 inner plate carrier
30 hub part
31 transmission input shaft
34 connecting part
36 outer plate carrier
38 second multiple-disk clutch arrangement
40 inner plate carrier
41 hub part
42 transmission input shaft
44 actuating lever
45 actuating lever
48 friction unit
49 friction unit
50 axis of rotation
59 pressure member
60 pressure member
61 torque delivery interface
62 torque delivery interface
64 collar
65 drive sleeve
67 arrow
68 arrow
67 arrow
70 pressure chamber
71 segment
72 ring chamber
74 ring-type basic body
76 driver cog
77 driver cog
78 driver cog
79 driver cog
81 recess
82 recess
84 pressure nose
85 leg
86 base
87 leg
89 protuberance

What is claimed is:

1. A torque transfer device in a power train (1) of a motor vehicle, comprising at least one wet-running clutch device (27, 38), which is actuatable by means of an actuating lever device (44, 45), through a pressure member (60), wherein the pressure member (60) has a blocking cross section (85-87) which is opened toward a pressure chamber (70) and wherein the blocking cross section comprises an essentially continuous annular ring for creating a pool of oil in an annular space between the pressure member and the clutch device.

2. The torque transfer device recited in claim 1, wherein the blocking cross section (85-87) is essentially C-shaped.

3. The torque transfer device recited in claim 1, wherein the annular space (72) is connected to the pressure chamber (70) through a leakage gap.

4. The torque transfer device recited in claim 1, wherein the pressure member (60) is of ring-type design.

5. The torque transfer device recited in claim 1, wherein the pressure member (60) has at least one torque delivery element, which is connected in a rotationally fixed connection to a pump drive element (65) at a torque delivery interface (61) between the pressure member (60) and the pump drive element (65) that drives a pump.

6. The torque transfer device recited in claim 5, wherein the pressure member (60) has at least one circular-arc-shaped recess (81, 82), radially at the inside.

7. The torque transfer device recited in claim 6, wherein a projection is provided radially at the outside on the pump drive element (65), which meshes with the recess (81, 82) of the pressure member.

8. The torque transfer device recited in claim 5, wherein the pump drive element (65) is rotatably supported by a bearing device with sealing function on a bearing element (40, 73) of the clutch device.

9. The torque transfer device recited in claim 1, wherein the pressure member (60) has at least one torque delivery element, which is connected in a rotationally fixed connection to the clutch device, at a torque delivery interface (62) between the pressure member (60) and a plate carrier (36) of the clutch device (38).

10. The torque transfer device recited in claim 9, wherein the pressure member (60) has at least one driver lug (76-79) radially at the outside.

11. The torque transfer device recited in claim 10, wherein a recess is provided on the clutch device which is engaged by the driver lug (76-79) of the pressure member (60).

12. The torque transfer device recited in claim 1, wherein the pressure member (60) is situated between the actuating lever device (45) and a clutch disk.

13. The torque transfer device recited in claim 12, wherein the pressure member (60) has a pressure nose (84) that is in contact with the clutch disk.

14. The torque transfer device recited in claim 1, wherein the pressure member (60), viewed in cross section, has a protuberance (89) with which the actuating lever device (45) is in contact.

15. A double clutch transmission, comprising:
two transmission input shafts; and,
a torque transfer device according to claim 1.

* * * * *